3,553,262
TETRACYCLIN ADAMANTOATES
Raymond Francois Jacques Sarbach and Dimitri Yavordios, Chatillon-sur-Chalaronne, France, assignors to Institut de Recherche Scientifique (I.R.S.), Ain, France, a French company
No Drawing. Filed Nov. 25, 1968, Ser. No. 778,839
Claims priority, application France, Dec. 1, 1967, 130,592
Int. Cl. C07c 103/19
U.S. Cl. 260—559  1 Claim

ABSTRACT OF THE DISCLOSURE

The invention has the purpose of introducing adamantoates of tetracyclins into human therapeutics. Tetracyclin adamantoates comply with the general following formula:

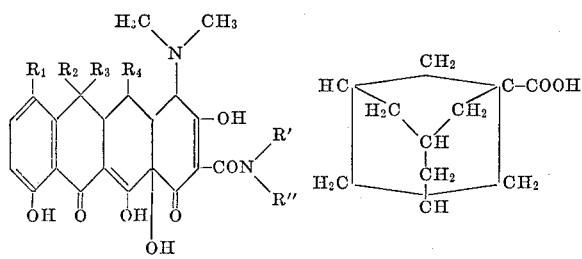

in which, in particular:

$R_1$=H or Cl
$R_2$=H or $CH_3$
$R_3$=OH or forms a methylene radical with $R_2$
$R_4$=H or OH
R' and R" represent hydrogen, identical or different alkylated, arylated, cycloalkylated, heterocyclic, etc., radicals.

---

The present invention has the purpose of introducing adamantoates of tetracyclins into human therapeutics, which are new bodies endowed with both antibiotic, antiviral properties.

These bodies thus possess a widened action spectrum both with regard to the antibiotic as well as the antiviral fraction.

Made up at medical weight, this new medicament occurs, alone or in a compatible association, under an acceptable therapeutic form, either in the form of tablets, capsules, and even suspension, of suppositories, ointment, etc.

According to the invention tetracyclin adamantoates comply with the general following formula:

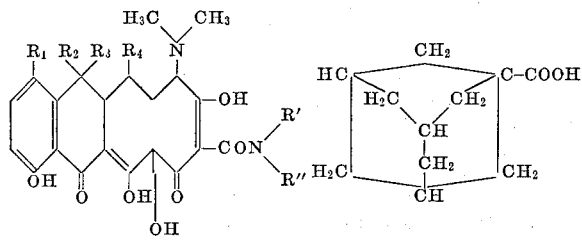

in which, in particular:

$R_1$=H or Cl
$R_2$=H or $CH_3$
$R_3$=OH or forms a methylene radical with $R_2$
$R_4$=H or OH
R' and R" represent hydrogen, identical or different alkylated, arylated, cycloalkylated, heterocyclic, etc., radicals.

Various other characteristics of the invention will moreover be revealed by the detailed description which follows.

The formula, method of preparation and characteristics of tetracyclin adamantoate are given hereafter by way of examples.

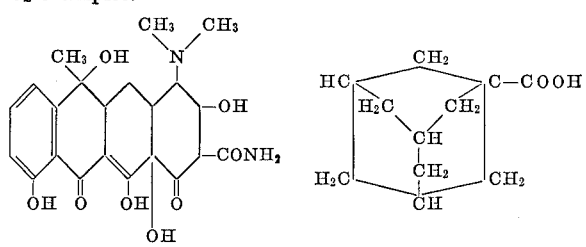

The latter has for a formula:

$C_{22}H_{24}N_2O_8 \cdot C_{11}H_{16}O_2$ (being $C_{33}H_{40}N_2O_{10}$)
Molecular weight: 624.67 g.
Basic tetracyclin: 71.14%
1-adamantane-carboxylic acid: 28.86%.

METHOD OF PREPARATION AND CHARACTERISTICS

Preparation

A molecule of 1-adamantane-carboxylic acid is dissolved in 20 litres of absolute ethanol, in a suitable receptacle.

A molecule of basic tetracyclin is added fairly quickly under stirring.

Stir for 10 minutes and then bring the solution to a temperature of 37–40° C. for 15 minutes, while continuing to stir.

Filter the solution.

Evaporate the alcohol by means of a vacuum stove or any other "ad hoc" equipment.

Characteristics

Appearance: Yellow coloured powder
Melting point (capillary tube): 133° C.
Saturated aqueous solution pH: 4.55
Rotary power: $\alpha_D = -160°$ (ethanolic solution at 96° C.)
Humidity (Karl Fischer): 2.50%
Solubilities:
   Distilled water: <0.1%
   Absolute ethanol: 2.2%
   Methanol: 3%
   D.M.S.O.: ≥10%
   Ethanol at 96°: ≥1.85%
Weight loss 60° C. under a vacuum 4 hours: 2%
U.V. spectrum The tetracyclin adamantoate shows, in a methanolic solution, the following characteristics:

Maximum: 218 m$\mu$–271 m$\mu$–365 m$\mu$
Minimum: 236 m$\mu$–312 m$\mu$

TOXOLOGICAL AND PHARMACEUTICAL STUDY

Acute toxicity

An endeavour was made to ascertain the DL 50 of tetracyclin adamantoate by oral means in male albino mice weighing 18/20 g.

The product was put into suspension in a carboxymethylcellulose solution at 0.5% and administered by means of oesophagian probe.

Ten mice were treated in these conditions and kept under observation during five days.

The administering of 3000 mg./kg. did not cause any death.

The DL 50 exceeded 3000 mg./kg.

Antibiotic activity

The antibiotic activity of tetracyclin adamantoate has been ascertained according to the technique stated in the "Pharmacopée Française," 1965 edition, page 1209, for tetracyclin hydrochlorate (turbidimetric method).

The average of several results shows the conformity and integrity of the autibiotic activity of samples tested with respect to standard tetracyclin hydrochlorate titrating 1000 µg./mg.

Examples

TESTING CURVE
[1D.O.=100 divisions]

| Tetracyclin hydrochlorate, µ g./ml. | Drum divisions | | | Average |
|---|---|---|---|---|
| 0 | 91 | 92 | | 91.5 |
| 0.015 | 83 | 82 | 81 | 82 |
| 0.02 | 75 | 73 | 74 | 74 |
| 0.03 | 58 | 56 | 56 | 56.6 |
| 0.04 | 44 | 48 | 44 | 45.3 |
| 0.06 | 28 | 28 | 29 | 28.3 |
| 0.08 | 22 | 20 | 21 | 21 |

| | Drum divisions | | | |
|---|---|---|---|---|
| | Scale No. 1 | Scale No. 2 | Scale No. 3 | Scale No. 4 |
| Theoretical concentration, µg./ml: | | | | |
| 0.03 | 57 | 60.6 | 57.3 | 59 |
| 0.04 | 44 | 45 | 42.3 | 44 |
| 0.06 | 25.6 | 28.3 | 28.3 | 27.6 |
| Degrees found, percent | 104.8 | 97.6 | 102.3 | 99.4 |

Antiviral activity

The virulicide activity of tetracyclin adamantoate has been studied with regard to an A PR 8 influenza virus stock cultivated on epithelial cells of calf kidney.

Procedure

The virus was cultivated on epithelial cells of calf kidney, the growth medium being lactalbumin hydrolysate to which 10% of calf serum was added.

From a parent alcoholic solution of tetracyclin adamantoate titrating 10 mg./ml.; dilutions in sterile distilled water were prepared as follows:

½  ¼  ⅕  ⅙  ⅛  ¹⁄₁₀  ¹⁄₂₀

0.5 ml. of each solution was put into contact during 45 minutes with 0.5 ml. of the viral suspension prepared in the cellular system defined above.

The various above-mentioned mixtures were added to the medium without serum so as to obtain a virus dilution to ¹⁄₂₀ and eliminate the cytotoxic effect of the products.

For each dilution, four tubes were used containing calf kidney cell cultures. The following operations were carried out:

Elimination of the medium
Inoculation of 0.1 ml. of each mixture diluted to ¹⁄₂₀ 30 minutes incubation at 37° C.
Washing the cellular coating
Addition of 2 ml. of survival medium (lactalbumin to which 3% of calf serum was added)
Incubation at 37° C.

The same procedure was followed for alcohol and virus tests.

The tubes thus prepared were incubated during 48 hours and observations were made on:

the presence or absence of cytopathogenic effect on microscopic examination;
the hemagglutination reaction of the floating liquids.

RESULTS

| | Alcohol test | | Tetracyclin adamantoate | |
|---|---|---|---|---|
| | Cytopathogenic effect | Hemagglutinating degree | Cytopathogenic effect | Hemagglutinating degree |
| Dilutions: | | | | |
| ½ | +++ | 1/1,024 | 0 | 0 |
| ¼ | +++ | 1/1,024 | 0 | 0 |
| ⅕ | +++ | 1/1,024 | 0 | 0 |
| ⅙ | +++ | 1/1,024 | +++ | 1/1,024 |
| ⅛ | +++ | 1/1,024 | +++ | 1/1,024 |
| ¹⁄₁₀ | +++ | 1/1,024 | +++ | 1/1,024 |
| ¹⁄₂₀ | +++ | 1/1,024 | +++ | 1/1,024 |

NOTE.—Virus test: Cytopathogenic effect=+++; Hemagglutinating degree=1/1,024.

Conclusions

Tetracyclin adamantoate has a virulicide effect on A PR 8 influenza virus, ascertained by the technique stated above.

THERAPEUTIC UTILIZATION EXAMPLE IN MANKIND

On the basis of the above-mentioned information, we may state that the active principle has both an antibiotic and an antiviral action.

The antibiotic action is very extensive and acts against most positive gram and negative gram germs, against "rickett-sides" (bacteria) etc.

Tetracyclin adamantoates thus have extremely vast indications; they are specifically useful in poorly defined, multiple and varied infectious germ processes.

This is the case, for instance, of influenza where the causal virus, responsible for the fundamental syndrome, is very frequently associated with microbian germs, responsible for accompanying infectious processes.

With adults, there would then be an average of 6 to 8 tablets or capsules administered made up of 250 mg. of tetracyclin adamantoate into three of four doses.

We claim:
1. A compound of the formula:

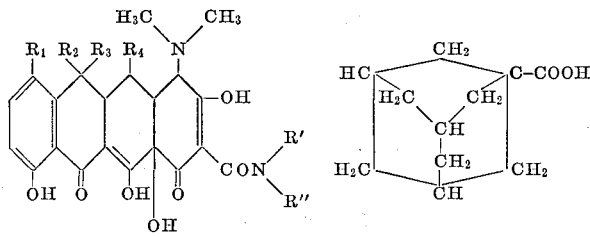

in which:

$R_1$=H or Cl
$R_2$=H or $CH_3$
$R_3$=OH or forms a methylene radical with $R_2$
$R_4$=H or OH
R' and R'' represent hydrogen.

References Cited

UNITED STATES PATENTS 2,791,609  5/1957  Kaplan _____ 424—180
3,356,571  12/1967  Takesue et al. _____ 424—227

ALEX MAZEL, Primary Examiner
A. M. T. TIGHE, Assistant Examiner

U.S. Cl. X.R.

424—227